O. F. SHEPARD, Jr.
CONTROLLER FOR ELECTRIC MOTORS.
APPLICATION FILED JAN. 15, 1906.

936,952.

Patented Oct. 12, 1909.
3 SHEETS—SHEET 1.

Witnesses
Homer Bradford
L. W. Jones

Inventor
Oscar F. Shepard Jr.
by John Elias Jones,
Attorney

O. F. SHEPARD, Jr.
CONTROLLER FOR ELECTRIC MOTORS.
APPLICATION FILED JAN. 15, 1906.

936,952.

Patented Oct. 12, 1909.
3 SHEETS—SHEET 2.

UNITED STATES PATENT OFFICE.

OSCAR F. SHEPARD, JR., OF CINCINNATI, OHIO, ASSIGNOR TO THE WARNER ELEVATOR MANUFACTURING COMPANY, OF CINCINNATI, OHIO, A CORPORATION OF OHIO.

CONTROLLER FOR ELECTRIC MOTORS.

936,952. Specification of Letters Patent. Patented Oct. 12, 1909.

Application filed January 15, 1906. Serial No. 296,191.

*To all whom it may concern:*

Be it known that I, OSCAR F. SHEPARD, Jr., a citizen of the United States of America, and a resident of Cincinnati, in the county of Hamilton and State of Ohio, have invented certain new and useful Improvements in Controllers for Electric Motors, of which the following is a specification.

This invention relates to certain improvements in controllers and more particularly in controllers of the magnetic rheostat type, and the object of the invention is to provide a device of this character of a comparatively simple and inexpensive nature which shall be adapted for employment not only for the variation of the starting resistance but shall also be capable of operation for effecting a variation of resistance in the shunt field circuit, whereby the improved controller is especially adapted for service in connection with shunt and compound wound motors for effecting speed variations during the operation of the motors.

The invention consists, in part, in a controller of this general character wherein the magnetic elements are adapted for inclusion in the shunt field windings of the motor, so as to form, essentially, parts or sections of the shunt field resistance, whereby, in the practical employment of the improved controller, an important economy in the consumption of energy is attained.

The invention further consists in the employment, in the improved controller, of means actuated from each of the respective magnetic elements and controlling the circuit connections of the succeeding magnetic elements, whereby the operation of the improved controller in effecting the several resistance variations is rendered substantially automatic in character.

The invention also contemplates certain novel features of the construction and combinations and arrangements of the several parts of the improved controller, whereby certain important advantages are attained and the device is rendered simpler, cheaper and otherwise better adapted and more convenient for use, and whereby precaution is afforded against damage due to carelessness and inexperience on the part of the operator, as will be hereinafter fully set forth.

The novel features of the invention will be carefully defined in the claims.

In the accompanying drawings which serve to illustrate my invention

In these views 1 indicates a switch-board whereon is mounted a main switch comprising a shaft 6 mounted to rock between upper and lower rows or series of contacts and carrying switch elements 7 and 8 insulated from each other and adapted, respectively, when the shaft is rocked, to make simultaneous connection with certain contacts of the upper or lower series. The arrangement of contacts in the upper and lower series is similar and corresponding contacts in the respective series are electrically connected so that similar connections are afforded by the elements 7 and 8 no matter in which direction shaft 6 is rocked, it being understood, however, that when the shaft is rocked to bring its elements 7 and 8 to a position central between the upper and lower series of contacts, electrical communication of said elements with each series of contacts will be interrupted.

2 and 3 indicate the respective terminals of the feed or supply circuit which are connected, respectively, with contacts 4, 4 and 5, 5 similarly located in the upper and lower groups or series of the main switch and adapted, when the shaft 6 is rocked in either direction from its central position, to be engaged by the respective switch elements 7 and 8, whereby communication is established from the terminal 2 to the element 7 and from the element 8 to the terminal 3.

Adjacent to the contacts 4 for the feed terminal 2, the upper and lower series or rows on the switch-board 1 comprise other contacts 9, adapted, when the shaft 6 is rocked, to be engaged by the switch element 7, whereby electrical communication is established across the element 7 between the contacts 4 and 9 and the contacts 9 have connection with a conductor 10 leading to one arm or element 11 of a reversing switch having a shaft 12 and adapted for operation in unison with the main switch shaft 6 so that said arm or element 11 is adapted for making electrical connection with either of two contacts 13 or 14$^a$, it being understood that when the shaft 12 is rocked in one direction, said arm 11 communicates with the contact piece 13 and when said shaft is reversely rocked, said arm 11 communicates with the other contact 14$^a$.

15 is a conductor extended from the reversing contact 13 to the motor 22 where it has communication with the windings or the armature 16 of the motor and 17 is a return conductor extended from the opposite armature terminal of the motor to the reversing contact 14$^a$.

11$^a$ is another arm or element on shaft 12 of the reversing switch and insulated from arm 11 and adapted, when said shaft is rocked, to communicate with one or the other of two contacts 13$^a$ and 14 simultaneously as the arm 11 communicates with one or the other of the respective contacts 13 or 14$^a$. The contact 13$^a$ has electrical connection with the conductor 17, so that when the reversing switch is actuated to establish communication of arms 11 and 11$^a$ with the respective upper contacts 13 and 13$^a$, the current flows from the feed terminal 2 by way of contact 4, switch element 7, contact 9, conductor 10, switch arm 11, contact 13 and thence by way of conductor 15 to and through the armature windings of the motor 22, whence it flows by the return conductor 17 to contact 13$^a$ and switch arm 11$^a$.

Figures 2, 4, 5:
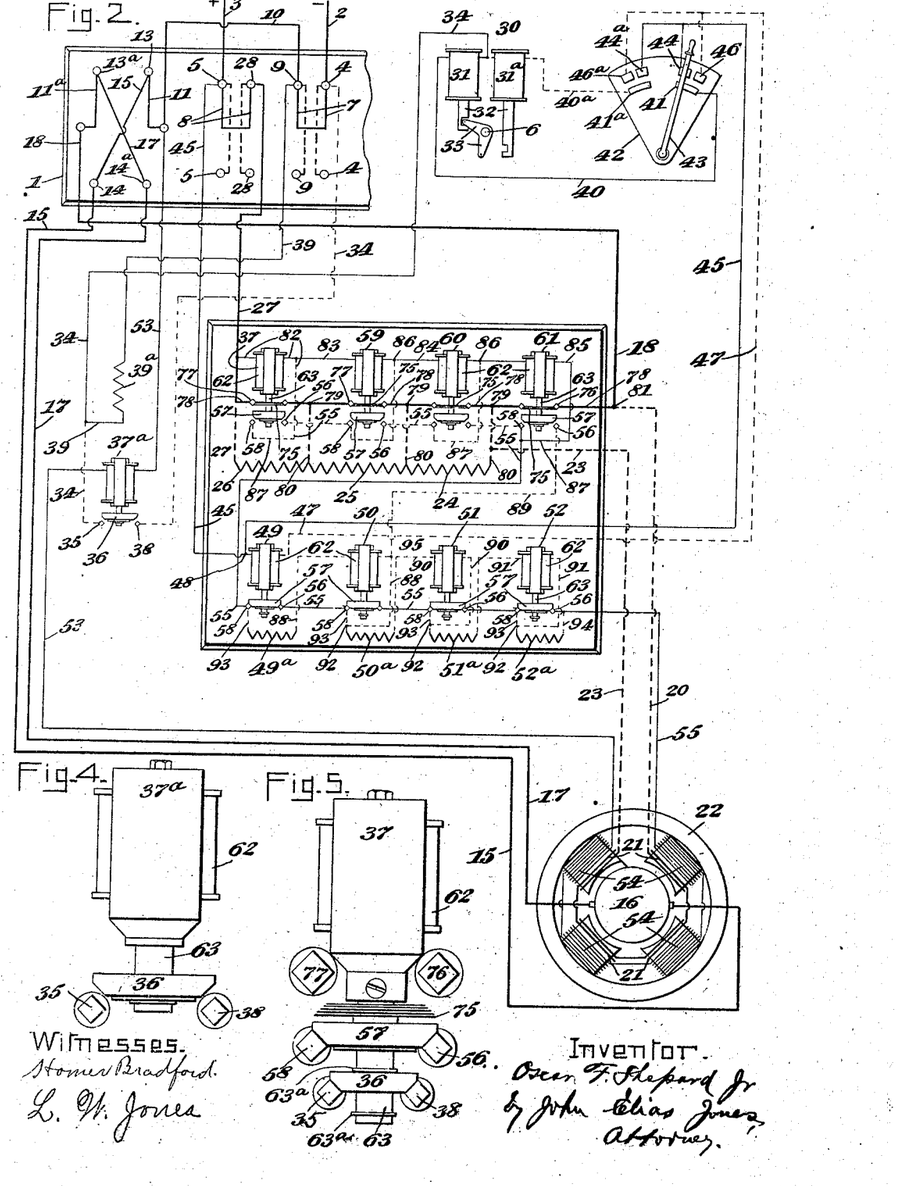
Fig. 2 is a diagraphic view somewhat similar to Fig. 1, but showing the positions assumed by the parts of the improved controller when actuated to cut out the starting resistance, a modified arrangement of the means for preventing damage due to too sudden reversal of the motor being also illustrated in this view.
Fig. 4 is a detail view showing in elevation, detached and on an enlarged scale, the means, illustrated in Figs. 2 and 3, for safeguarding against too sudden reversal of the motor.
Fig. 5 is a view similar to Fig. 4, but illustrating the alternative safeguarding means shown in Fig. 1.
Figures 3, 6, 7, 8:
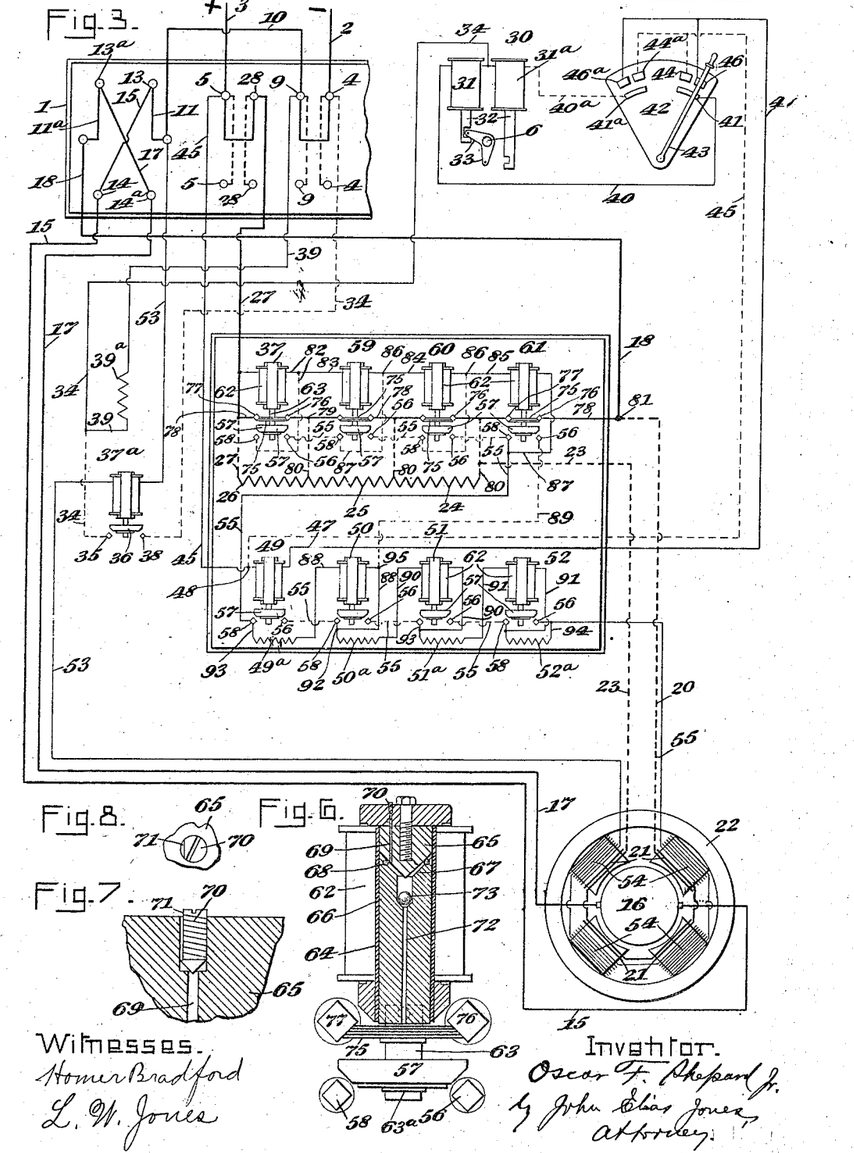
Fig. 3 is a view similar to Fig. 2, but showing the positions assumed by the parts of the improved controller when actuated to augment the shunt field resistance of the motor for increasing the running speed thereof.
Fig. 6 is a sectional view taken axially through one of the magnetic elements of the improved controller and illustrating certain features of the means for retarding the operation thereof.
Fig. 7 is an enlarged sectional detail view showing the arrangement of the valved air vent forming part of the retarding means illustrated in Fig. 6.
Fig. 8 is a partial plan view showing the construction of the valve controlling the vent of said retarding means.

The reversing contact 14 of the switch arm 11$^a$ is in communication with the conductor 15 and when the shaft 12 is reversely rocked from the position shown in Figs. 2 and 3, communication is established between the arms 11 and 11$^a$ and their respective lower contacts 14$^a$ and 14, so that the current flow from the switch arm 11 through the armature 16 of the motor 22 is reversed, such flow being then from arm 11 to contact 14$^a$ and thence by conductor 17 to and through the windings of armature 16, whence it returns by conductor 15 to contact 14 and switch arm 11$^a$.

From the switch arm 11$^a$ of the reversing switch are extended conductors 18 and 20, leading to the series field windings 21 of the motor 22 and from the opposite terminal of said series field windings is extended a conductor 23 leading to the starting resistance, comprising sections 24, 25 and 26, whence extends a conductor 27 leading to main switch contacts 28 on the switch-board 1 opposite to the contacts 5 thereon and adapted, when the shaft 6 is operated, to communicate therewith and with the feed terminal 3 through the switch element 8.

Figures 1, 9:
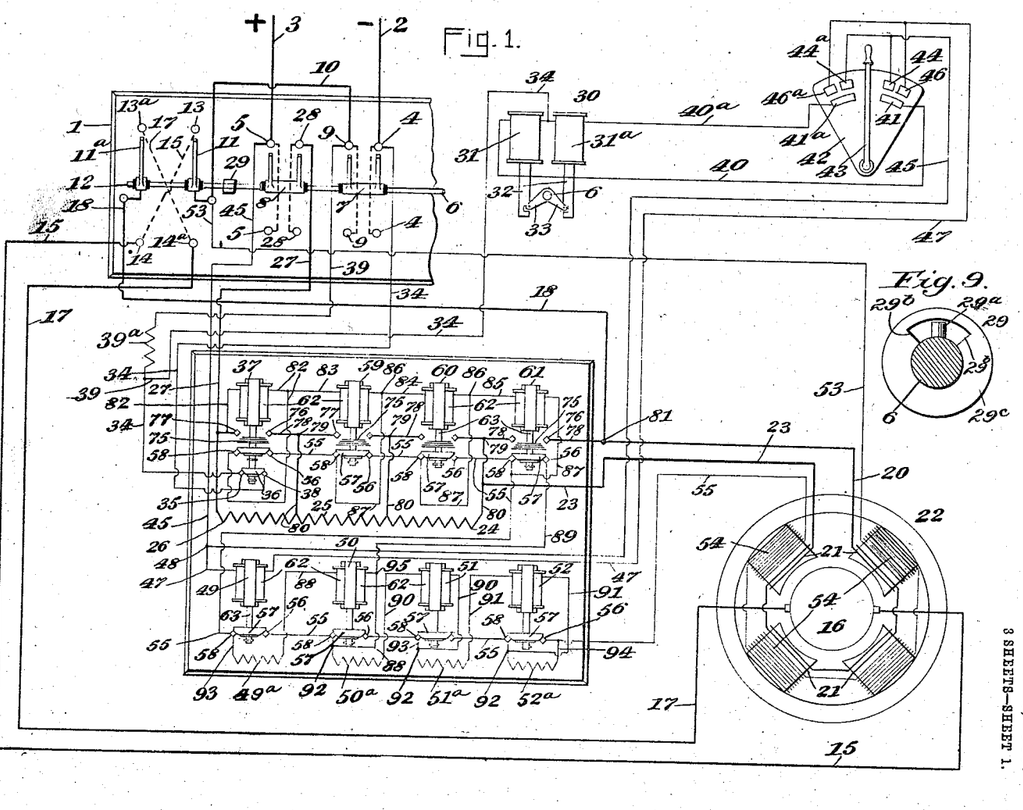
—Figure 1 is a diagraphic view showing a controller embodying my improvements, the several parts being shown in the positions wherein they stand when the motor is at rest.
Fig. 9 is a detached detail view showing the main-switch shaft in cross-section for illustration of the compensating or loose connection between said main-switch shaft and the shaft of the reversing-switch.

29 represents a loose or compensating connection between the main switch shaft 6 and the shaft 12 of the reversing switch so that the said reversing switch shaft 12 is operated and rocked in unison with the movement of the main switch shaft 6, but to a lessened extent, whereby the reversing switch shaft 12 is permitted to lag behind the main switch shaft 6 to an extent such that the arms 11 and 11$^a$ of the reversing switch remain in communication with their respective contacts 13 and 13$^a$ or 14$^a$ and 14 until and while the main shaft 6 has been rocked to its central position wherein the main switch elements 7 and 8 are midway between their respective upper and lower contacts 4, 9, 28 and 5. By reason of this compensating or loose connection 29, when the main shaft 6 is operated to move it to a central position wherein its elements 7 and 8 are out of communication with their respective contacts, the arms 11 and 11$^a$ of the reversing switch will remain in communication with those contacts 13 and 13$^a$ or 14$^a$ and 14 with which they were previously engaged and such communication of the reversing switch arms and contacts will not be interrupted until the main shaft 6 shall have been rocked past its central position to bring its elements 7 and 8 into communication with those main switch contacts opposite to the main switch contacts with which communication was previously established. As shown in Fig. 9, this compensating or loose connection 29 comprises a pin or projection 29$^a$ on main-shaft 6 and adapted, when said main-shaft is rotated, for a certain extent of free movement or play between shoulders 29$^b$, 29$^b$ within a collar 29$^c$ on the reversing-switch shaft 12. The detailed construction of the loose or compensating connection 29 is unimportant and the purpose of the arrangement and operation above described will be hereinafter explained.

For rocking the main switch shaft 6 I prefer to provide an electrically actuated mechanism shown at 30 on the drawings and comprising two solenoids 31 and 31ª mounted side by side with cores 32 adapted to fall to a lowered position by gravitation and provided with notches at their lower ends for engagement with rollers at the extremities of oppositely divergent and downwardly inclined arms 33 upon said main shaft 6, the construction and arrangement being such that when both solenoids 31 and 31ª are deënergized, their cores will drop by gravity and move the shaft 6 to a central position with its elements 7 and 8 central between and out of communication with both the upper and lower series of contacts 4, 9, 28 and 5, and when one of said solenoids as, for example, the solenoid 31, is energized, its core 32 will be uplifted, as shown in Figs. 2 and 3, whereby the main shaft 6 will be rocked to its fullest extent in one direction so that, as shown in Figs. 2 and 3, the elements 7 and 8 of the main switch will be brought into communication with the upper series of contacts 4, 9, 28 and 5 and the arms 11 and 11ª of the reversing switch will likewise be brought into communication with the upper contacts 13 and 13ª. Should the solenoid 31ª be energized instead of the solenoid 31, it is evident that a reverse rocking movement of shaft 6 would be effected, resulting in a reversal of the communications of the switch elements and arms 7, 8, 11 and 11ª.

For controlling the operation of the switch actuating device 30, I preferably provide a pilot switch such as is shown at 42, and which is also adapted for controlling the operation of certain other mechanisms as will be hereinafter explained. The windings of the solenoids 31 and 31ª have common connection with a conductor 34 leading from the main switch contacts 4 where it has connection with the feed terminal 2 for the supply of energy for operating the actuating mechanism 30. Said conductor 34 includes two separated terminals or contacts 35 and 38 which are adapted to be bridged over and electrically connected when the parts are at rest, as seen in Fig. 1, by a carbon block or contact piece 36 forming part of an auxiliary controlling switch which is adapted for automatic operation, as will be hereinafter explained, for controlling the supply of energy to the switch actuating mechanism 30 from the feed terminal 2.

The windings of the respective solenoids 31 and 31ª have independent connection by way of conductors 40 and 40ª, respectively, with similar but insulated contacts 41 and 41ª of the pilot switch 42, said contacts 41 and 41ª being at opposite sides of the central position of a switch lever 43 so that, when said lever is moved in one direction, it will communicate with one of said contacts, as for example, the contact 41 as the parts are seen in Figs. 2 and 3, to energize the solenoid 31 and rock the switch shaft 6 in one direction, or when said lever 43 is reversely moved and communicates with contact 41ª, communication will be established through conductor 40ª with solenoid 31ª which will thereupon be energized to reversely rock the main switch shaft 6.

44 and 44ª are other contacts above the contacts 41 and 41ª and also at opposite sides of lever 43 when centrally positioned so that when said lever is moved to communicate with one or the other of the contacts 41 and 41ª it will also communicate with the corresponding contact 44 or 44ª. Contacts 44 and 44ª have common connection with a conductor 45 leading to the contacts 5 of the main switch and communicating through the same with the feed terminal 3, so that when lever 43 is moved in one direction, as toward the right to the position shown in Fig. 2, whereby communication is established through it between contacts 41 and 44, the current will flow from terminal 2 by way of conductor 34 (the space between its included contacts 35 and 38 being then bridged by the block 36) to and through the windings of solenoid 31 and by way of conductor 40, contact 41, lever 43, contact 44, conductor 45 and contacts 5 to feed terminal 3. When the lever 43 is reversely moved, the current traverses a similar path except that the circuit connections of solenoid 31ª are substituted for the parallel connections of solenoid 31 in order that the solenoid 31ª may be energized to reversely move the main switch shaft 6.

The shunt field circuit includes a conductor 53 in communication with feed conductor 2 through conductor 10, contacts 9 and 4 and switch element 7 and leading to the shunt field coils 54 of the motor 22, whence is extended a conductor 55 which includes the terminal contacts and circuit closing parts or connectors of a plurality of circuit breaking devices which are normally closed as shown in Fig. 1 at starting and which have functions which will be hereinafter explained. Said conductor 55 also includes a partial circuit 82 traversing the solenoid coil of the auxiliary controlling switch 37 (see Fig. 1) by means of which the supply of energy for the operation of the switch actuating mechanism 30 is controlled as above set forth. The partial circuit 82 has connection with the conductor 27 leading from the series field windings to the contacts 28 of the main switch and communicating through switch element 8 with the contacts 5 of the feed terminal 3, so that when the circuit is closed at the main switch, the current will flow from feed terminal 2 by way of contacts 4, switch element 7, contacts 9, conductors 10 and 53 to and through the shunt field coils 54 at the motor, returning by way of conductor 55 (including the lowered connectors of the several circuit breaking devices) partial circuit 82, conductor 27, contacts 28, switch element 8 and contacts 5 to feed terminal 3.

As shown in the drawings, the improved controller is provided with eight magnetic rheostat elements, each of which comprises a solenoid 62 having a movable core provided with a pendent stud 63 at its lower end whereon are carried certain circuit making and breaking devices as will be hereinafter explained. These eight rheostat elements are divided into upper and lower groups of four elements each, the upper group of elements 37, 59, 60 and 61, being adapted for successive operation to control the starting resistance which may be said to include the three starting resistance sections 26, 25 and 24, together with the series field windings 54 of the motor, while the lower group of elements 49, 50, 51 and 52 are adapted for successive operation to control the insertion of four resistance sections 49ª, 50ª, 51ª and 52ª in the shunt field circuit of the motor for varying the running speed of the motor after starting. It will, however, be apparent that the number and grouping of the magnetic rheostat elements in the improved controller is immaterial to the present invention and may be varied at will to conform to various modifications and arrangements of the resistance sections which may be found desirable in practice. For example, either the starting resistance sections, together with the magnetic elements for their control, may be in greater or less number, or may even be omitted altogether, the series field windings, in some motors serving to afford sufficient resistance for starting, or said series windings may be divided in sections each controlled by a magnetic element or said windings, together with the magnetic element for their control may be dispensed with as in the case of a simple shunt wound motor. Or, if desired, the shunt resistance sections, together with the magnetic elements controlling their insertion may be dispensed with without departure from the principles of the invention.

The several magnetic rheostat elements are provided with retarding means whereby the operation of the improved controller in cutting out and inserting the successive resistance sections is timed to afford a sufficient interval between the successive resistance variations so that damage to the parts is prevented, and the preferred construction of said magnetic elements is illustrated in Figs. 6, 7 and 8, wherein the windings of the solenoid 62 are shown applied upon a brass tube 64, the bore of which is arranged to snugly receive the core 66 so that undue escape of air between the parts is prevented when the core is moved vertically in said tube. The upper end of the bore of said tube is also closed by a plug or cap 65 having a conical lower end depending within the upper end of said bore, and the upper end of said core 66 has a central conical recess 67 and carries a packing or buffer 68 in annular form and adapted, by engagement on the conical lower end of the plug or cap 65, to receive the impact of said core when the same is elevated at the energization of the solenoid.

69 is an air duct produced in the cap or plug 65 and adapted for the escape of air from the bore of tube 64 when the core 66 is elevated therein, the upper end of said duct being counterbored as seen at Fig. 7 to receive a screw valve 70, one side of which is slightly cut or filed away to produce an outlet as seen at 71 for the discharge of air escaping by way of the duct 69. The enlarged or counterbored upper end of the duct 69 wherein the screw valve 70 is received affords a valve seat surrounding the duct and the lower end of said screw valve is tapered to produce a valve surface which, when the screw is turned, is adapted to be moved toward or away from said valve seat to increase or diminish the capacity of the duct for the discharge of air.

Since the air is prevented from escaping between the core 66 and tube 64 when said core is elevated at the energization of the solenoid, it follows that said air being imprisoned in said tube forms an elastic cushion by means of which the elevation of the core is retarded in a well known way, and the screw valve 70 being properly adjusted, the escape of air at the duct 69 is very gradual so that a sufficient interval of time is afforded in the operation of the magnetic rheostat element to prevent damage to the parts from operation of the elements in too rapid succession. But when the solenoid is deënergized it is desirable to permit its core to fall quickly by gravitation and since the construction above described would serve to retard the descent of the core as well as its elevation, I provide the core 66 with an axial duct 72 counterbored at its upper end where it communicates with the central conical recess 67 at the upper end of the core. By means of said counterbore a valve seat is produced surrounding the duct 72 and said seat is normally engaged by a ball valve 73 in the counterbore and serving to prevent escape of air by way of duct 72 when the core is moved upward, while, when the solenoid is deënergized, air is permitted to freely pass the valve 73 and enter the bore of tube 64 to permit the core 66 to drop quickly by gravitation so that the elements may be returned to their positions of rest in a substantially instantaneous manner when the controller is operated to open one or another of the motor circuits.

Each magnetic element 37, 59, 60 and 61 of the upper group comprises a circuit closing device formed of a laminated copper brush 75 carried by the stem 63 of its solenoid core and normally, when the parts are at rest as shown in Figs. 1 and 5, said brush is out of contact with superposed contact points 76 and 77 which are included, respectively, in partial circuits 78, 78, having series connection with each other as seen at 79, the partial circuits 78, wherein are included the contacts 76 and 77 of the circuit closing devices of the first three magnetic elements 37, 59 and 60 of said upper group being, respectively, connected by conductors 80 in parallel with the several resistance sections 26, 25 and 24 of the starting resistance, while the fourth partial circuit 78, which includes the contacts 76 and 77 of the circuit closing device of element 61, has connection, as shown at 81, with the conductor 18 of the series field circuit and consequently is in parallel connection with the series field windings of the motor. By this arrangement it will be evident that when the elements 37, 59, 60 and 61 of the upper group are operated and their solenoids 62 are energized to elevate their cores, the respective partial circuits 78, each of which is normally open between the contacts 76 and 77 will be completed by the movement of the brushes 75 on the stems 63 into engagement with said contacts, whereby in the successive operation of the several magnetic elements, the starting resistance sections 26, 25 and 24 will first be successively short-circuited and afterward, by the operation of the last element 61 of the group, the series field windings 21, which constitute, essentially, the final section of the starting resistance, will also be short circuited.

Each of the magnetic rheostat elements in both the upper and lower groups comprises a circuit breaking device formed of a carbon contact brush or connector 57 and contact points or terminals 56 and 58, between which communication is established by said brush or connector when in its normal lowered position of rest as shown in Fig. 1. Each brush or block 57 is carried loosely on the pendent stem 63 of the core of the corresponding solenoid 62, being insulated from such stem, however, and said stem is adapted for a certain extent of vertical movement independent of the brush or connector 57, so that when the solenoid is deënergized and its core falls by gravitation, the brush or connector will engage and rest upon its contacts 56 and 58 to establish communication between said contacts before the stem 63 of the solenoid shall have reached its lowermost position. Conversely, when the solenoid is energized, its core and stem 63 are elevated to a certain extent before the connector or brush 57 is raised to break communication between contacts 56 and 58. This result is attained by perforating the connector 57 for the passage of stem 63 and by providing said stem with an enlargement 63ª (see Figs. 5 and 6) which, when the parts are at rest as seen in Figs. 1 and 5, stands below and out of engagement with the connector, but is adapted to pick up and elevate the same in the upward movement of the core at the energization of the solenoid.

As above set forth, the circuit breaking devices of the several magnetic elements 37, 59, 60, 49, 50, 51 and 52 have their contacts 56 and 58 included in the conductor 55 of the shunt field circuit, so that, in the normal position of the parts at starting and before the solenoids of the magnetic elements have operated, the current in the shunt field circuit traverses each of the connectors 57 which, being then in lowered position, afford communication between their respective contacts 56 and 58.

82, 83, 84 and 85 indicate four partial circuits which include, respectively, the coils of the solenoids 62 of the several magnetic elements 37, 59, 60 and 61 of the upper group, and these partial circuits have series connection with each other as shown at 86 and also have connection with the conductor 55 of the shunt field circuit wherein the contacts of the circuit breaking devices of the magnetic elements 37, 59 and 60 of the upper group are normally included. The partial circuit 82 for the solenoid winding of the element 37 is, as above stated, essentially a part of the conductor 55 so that it will be seen that as soon as the controller is actuated to close the circuit at the switch-board by manipulation of the lever 43 of the pilot switch 42 as above described, the solenoid of the element 37, which is designed for primary or initial controlling operation among the magnetic elements of the upper group, will be energized, and by raising its core will operate to break communication between the contacts 56 and 58 of its circuit breaking device.

In Fig. 1, the contact block 36 of the auxiliary switch for controlling the supply of energy to the main switch actuating mechanism 30 is carried upon the stem 63 of the solenoid of the magnetic element 37 and is arranged to operate in a way similar to the connector 57 to break communication between its contacts 35 and 38 when said stem 63 is moved upward at the energization of said solenoid. 39 is a conductor connected with the conductor 34 in parallel with the auxiliary switch formed of contacts 35 and 38 and block 36 and connected with the main switch contacts 9 which communicate through switch element 7 and contacts 4 with the feed terminal 2, and in said parallel conductor 39 is included a resistance 39ª of sufficient capacity by means of which the current from the feed conductor is normally prevented from traversing the conductor 39 and short circuiting the auxiliary switch. By this arrangement it will be seen that when the solenoid of element 37 is energized on the closing of the motor circuits as above described, the block 36 of the auxiliary switch will be raised to break communication between the contacts 35 and 38, whereupon the current from feed terminal 2 will traverse the conductor 39, the resistance 39ª of which will serve to cut down the supply of energy to the energized solenoid at the switch actuating mechanism 30, so that only sufficient energy will be supplied thereto to permit the energized solenoid to retain the main switch shaft 6 in the position to which it was rocked when the pilot switch lever 43 was first thrown. In this way it will be seen that when the pilot switch is first manipulated to operate the switch actuating mechanism 30, an ample supply of energy is supplied to said mechanism 30 by way of the auxiliary switch to permit the mechanism to perform the heavier duty imposed upon it, but as soon as the main switch is operated and the power required to be exerted at the mechanism 30 for retaining the main switch in position is lessened, the element 37 will act to lift the block 36 of the auxiliary switch and cut the resistance 39ª into circuit with said switch actuating mechanism 30 to reduce the supply of current thereto.

In Figs. 2 and 3, the arrangement of the auxiliary switch for controlling the supply of energy to the main switch actuating mechanism 30 is illustrated in a modified form, being embodied as a separate device instead of as a part of the first magnetic element 37 in the upper group. As herein shown the auxiliary switch device 37ª is formed similarly to one of the elements 59, 60 and 61, except that it is provided with no circuit closing device similar to the brush 75 and contacts 76 and 77, but carries on the stem of its solenoid 63, as shown in the detail view Fig. 4, the block 36 normally bridging the space between contacts 35 and 38, but adapted to be lifted out of communication therewith on the energization of the solenoid 62, the winding of which, as shown in Figs. 2 and 3 is included in the shunt field conductor 53 so that said solenoid will be energized to break communication between contacts 35 and 38 as soon as the main switch shall have been thrown to close the motor circuits.

Each of the partial circuits 83, 84 and 85 for the elements 59, 60 and 61 of the upper group has a circuit connection at 87 with the conductor 55 of the shunt field circuit, and each of these last-named partial circuits is thereby connected in the shunt-field in parallel with the circuit-breaking device of the preceding magnetic element, the partial circuit 83 for element 59 being connected in parallel with the circuit-breaking device of the element 37, the partial circuit 84 for element 60 being in parallel with the circuit-breaking device of element 59 and the partial circuits 85 for the element 61 being connected in parallel with the circuit-breaking device of the element 60. Said partial circuits are therefore open to the flow of current through the shunt field, but since each such partial circuit includes a certain resistance in the shape of the coil of the corresponding solenoid 62, it is evident that in the normal position of the parts with the connectors 57 bridging the contacts 56 and 58, the current will traverse the conductor 55 past each circuit-breaking device to and through the partial circuit 82 and the solenoids of elements 59, 60 and 61 will not be energized until after the first element 37 shall have operated its circuit-breaking device to interrupt communication between its contacts 56 and 58.

As above stated, the circuit-breaking devices of the magnetic elements of the upper group have their connectors 57, 57, normally in lowered or closed position, while the brushes 75 of the circuit-closing devices for said elements are normally in lowered position out of contact with their contact points 76 and 77, whereby the partial circuits 78, 78, are normally open, but it is evident that when the several magnetic elements are actuated and their solenoid cores are elevated, the connectors 57 and brushes 75 will be reversely actuated, whereby communication is interrupted between the contact points 56 and 58 of the circuit-breaking devices while communication is effected between the contacts 76 and 77 by engagement of the brushes 75 therewith, so that the partial circuits 78, 78, are successively closed for short-circuiting the several sections 26, 25 and 24 of the starting resistance, together with the series-field windings 21, as said elements 37, 59, 60 and 61 of the upper group are successively operated, and since the stems 63 of the solenoid cores of said elements are capable, as above explained, of a certain extent of upward movement before the connectors 57 are picked up to break communication between contacts 56 and 58, it is obvious that the brushes 75 will, by such independent initial movement of the stems 63, be moved into communication with their contacts 76 and 77 before communication is interrupted between contacts 56 and 58 and consequently the operation of the magnetic elements in closing the partial circuits 78 and cutting out the sections of the starting resistance and series field coils 21 is timed and assured before the several circuit breaking devices are operated.

When the connector 57 of the circuit breaking device for the primary or controlling element 37 of the upper group, on the actuation of said element after closing of the motor circuits, is lifted out of communication with its contacts 56 and 58, the corresponding partial circuit 78 will be closed to short circuit the first section 26 of the starting resistance, and the flow of current from the shunt field conductor 55 through partial circuit 82 will be interrupted, whereby the next partial circuit 83 parallel with the circuit breaking device of the element 37 in the shunt field circuit and including the solenoid winding for the next element 59 in the upper group will be traversed by the shunt field current, whereby said next element 59 will be actuated by the energization of its solenoid and at the same time, by reason of the series connection at 86 between the partial circuits 82 and 83, the solenoid of said first element will remain energized so that the partial circuit 82 will remain interrupted between contacts 56 and 58.

The operation of the element 59 on energization of its solenoid is substantially similar to the operation of the primary or controlling element 37 above described, the stem 63 being raised to lift connector 57 out of communication with the contacts 56 and 58 to interrupt the supply of current from the shunt field to the corresponding partial circuit 83 through the connection 87 of said partial circuit with the shunt field conductor 55 and simultaneously with such interruption to close the corresponding partial circuit 78 whereby the next succeeding section 25 of the starting resistance is cut out of the series field. By this operation of the second element 59 of the upper group, the partial circuit 84 for the third element 60 and which is in the shunt field circuit parallel with the circuit breaking device of element 59 is cut into said circuit so that the third element 60 will be operated in a manner similar to the elements 37 and 59, cutting out the third starting resistance section 24 and cutting the partial circuit 85, parallel with its circuit breaking device and including the solenoid winding of the fourth element 61 of said upper group into the shunt field circuit so that said fourth element will be likewise actuated to cut out the series field coils 21 of the motor.

The magnetic elements 49, 50, 51 and 52 of the lower group are substantially similar to those of the upper group in construction and arrangement except that the circuit closing devices comprising brushes 75 and contacts 76 and 77 with their appropriate circuit connections are dispensed with, said lower elements being provided only with the circuit breaking devices comprising connectors 57 controlling communication between contacts 56 and 58 which are included in the shunt field circuit conductor 55 so that the flow of current through said conductor may be interrupted at various points by the successive operation of said elements 49, 50, 51 and 52 of the lower group. The first element 49 in said lower group is also, like the first element 37 in the upper group, adapted for primary or initial actuation among the four lower elements and exerts a controlling influence upon the remaining elements of said lower group which cannot be operated until after said first element 49 shall have completed its operation and lifted the connector 57 of its circuit breaking device to interrupt communication between the contacts 56 and 58.

The solenoid winding of the primary element 49 of the lower group is included in a partial circuit 47 which is arranged for parallel inclusion in the supply circuit for the solenoids 31 and 31ª for the main switch actuating mechanism 30, for which purpose one terminal of said partial circuit 47 has connection as seen at 48 with the conductor 45 leading from the contacts 5 of feed terminal 3 at the switch-board and the opposite terminal of said partial circuit has common connection with contacts 46 and 46ª similar to but arranged outside of the above described contacts 44 and 44ª at the pilot switch so that the lever 43 at said pilot switch when first moved to establish communication between contacts 41 and 44 (or 41ª and 44ª as the case may be) to energize the solenoid at the switch actuating mechanism 30 may be afterward further moved to a second position, as for instance toward the right as shown in Fig. 3, whereupon it establishes communication between contacts 41 and 46 and the current for energizing the solenoid at mechanism 30 is caused to traverse the partial circuit 47 and to energize the solenoid at the controlling element 49 of the lower group. By this arrangement it will be evident that, since the operation of elements 50, 51 and 52 are under control from the first or primary element 49 in the lower group and said primary element 49 is itself under control of the operator through the pilot switch, the insertion of the shunt field resistance sections for variation of the running speed of the motor cannot be effected until after the operator shall have suitably manipulated the pilot switch lever 43 to close the partial circuit 47. Thus the motor may be started and run at low speed by shifting the lever 43 to its first position wherein the upper elements are allowed to successively operate to cut out the starting resistance and series windings so that the motor is permitted to run with full current in the shunt field and when desired, the speed may be increased by further movement of the pilot switch lever whereby as will be presently explained, the shunt resistance sections 49ª, 50ª, 51ª and 52ª are successively inserted in the shunt circuit.

88, 90 and 91 are three partial circuits, somewhat similar to the partial circuits 83, 84 and 85 for the three last elements of the upper group, and these partial circuits 88, 90 and 91 include, respectively, the solenoid windings for the respective elements 50, 51 and 52 of the lower group and have series connection as shown at 92 with each other besides having connection as shown at 93 with the conductor 55 of the shunt field circuit, whereby each such partial circuit 88, 90 and 91 is connected in the shunt field parallel with the circuit breaking device, comprising connector 57 and contacts 56 and 58, of the preceding element, the arrangement being such that the partial circuit including the solenoid winding at element 50 is in the shunt circuit parallel with the circuit breaking device at element 49, the partial circuit 90 for element 51 being in parallel with the circuit breaking device for element 50 and the partial circuit 91 for element 52 being in parallel with the circuit breaking device for element 51. These several partial circuits 88, 90 and 91 for the elements 50, 51 and 52 of the lower group include the respective sections 49ª, 50ª and 51ª of the shunt field resistance and their resistance is therefore sufficiently high to insure the flow of the current along conductor 55 by way of connectors 57 of the circuit breaking devices when these parts are in their normal lowered position, so that, normally, the solenoids of the elements of the lower group will be deenergized so long as switch lever 43 is not manipulated to energize the solenoid at the primary or controlling element 49 of the group so as to lift its connector 57 and interrupt the shunt field current between the contacts 56 and 58 of its circuit breaking device. But when said pilot switch lever is so manipulated and the element 49 is operated to interrupt the shunt field circuit at its circuit breaking device the shunt field circuit will be caused to traverse the parallel partial circuit 88 including the first section 49ª of the shunt field resistance together with the solenoid winding at the next succeeding element 50 which will thereupon be energized and in its turn will serve to again interrupt the shunt field circuit at its circuit breaking device whereby the corresponding parallel partial circuit 90 including the next section 50ª of the shunt field resistance together with the coil of the solenoid at element 51 will be traversed by the shunt field current, energizing element 51 to operate its circuit breaking device so that the shunt field current will be caused to traverse the parallel partial circuit 91 including the next section 51ª of the shunt field resistance together with the solenoid winding at the last element 52 of the lower group, so that this last element will also be energized and operated to break communication between the contacts 56 and 58 of its circuit breaking device. The series connections of these partial circuits with each other as seen at 92 are beyond the resistance sections of the several partial circuits, so that when the circuit breaking devices are successively operated as above described, the said resistance sections will be connected in series in the shunt field circuit. The final section 52ª of the shunt field resistance is included in a partial circuit 94, connected in parallel with the circuit breaking device of the last element 52 of the group and in series with the partial circuit 91 which includes the solenoid winding of said last element so that as the element 52 is operated to break communication at its circuit breaking device, such operation will cause the shunt field current to traverse said partial circuit 94 including the last resistance section which is thereby also inserted in the shunt field in series with the first three sections 49ª, 50ª and 51ª.

By the construction above described it will be apparent that the elements of each group are under independent control of the operator at the switch lever 43, the elements of the first group being controlled by the initial movement of the pilot switch lever to contacts 44 or 44ª, while those of the lower group are under control by the further movement of said lever to contacts 46 or 46ª, but it will also be apparent that when said lever has been moved to either of its two positions, there is no further control of the operator as concerns the operation of the individual elements of either group. In this way when said pilot switch lever has been moved to one of its first positions as shown in Fig. 2 and the primary element 37 of the upper group is operated, control of the next element of said upper group passes to said primary element 37 and so on with each element of the group so that each element in that group is controlled by the preceding element. The same is true of the elements of the lower group after the primary element 49 thereof has been energized by movement of the pilot switch lever 43 to one of its second positions as shown in Fig. 3, and in this way precaution is afforded against damage to the parts from too rapid insertion or cutting out of the shunt and series resistance sections, since the retarding device of each element will afford a sufficient interval between each two successive resistance variations to prevent such damage.

By the arrangement above described, were the pilot switch lever 43 moved from its central position past its first contacts 44 or 44ª and into engagement with its second contact 46 or 46ª, it is evident that substantially simultaneous operation of the primary elements 37 and 49 of the respective upper and lower groups would occur, whereby the remaining elements in each group would be operated in unison so that the insertion of the shunt field resistance sections would be substantially simultaneous with the cutting out of the corresponding starting resistance sections, and to prevent such defective operation I provide means for controlling the operation of the elements of the lower group from those of the upper. This means comprises a partial circuit 89, one terminal of which has connection with the shunt field conductor 55 at a point between the circuit breaking devices of the element 61 and 49 in the respective upper and lower groups, while the other terminal of said partial circuit has connection at 95 with the partial circuit 88 which is provided for actuating the element 50 of the lower group. This partial circuit 89 being thus in series with conductor 55 and with the partial circuit 88, includes the contacts 56 and 58 which are normally bridged by the connector 57 of the circuit breaking device at element 61, and it follows that, when the shunt field circuit is broken at element 49 by movement of the pilot switch lever 43 past one of its first positions to a second position such as is shown at Fig. 3, the shunt field current will traverse the partial circuits 88 and 89 from the point of connection 98 of partial circuit 88 with shunt field conductor 55 at element 50 to the point of connection of partial circuit 89 with shunt field conductor 55, the connector 57 at element 61 being in lowered position since the preceding elements in the first group will not have had time to operate to energize said element and break said partial circuit 89. In this way, neither of the shunt resistance sections is inserted until after communication has been broken by way of the partial circuit 89, but when the elements of the upper group have finished operation, and the last element 61 has raised its core and operated its circuit breaking device to interrupt the partial circuit 89, that portion of the partial circuit 88 which is parallel in the shunt field with partial circuit 89 and includes the solenoid winding of element 50 together with the first section 49ᵃ of the shunt field resistance will be traversed by the shunt field current, said resistance section being thereby inserted in the shunt field to increase the running speed and the element 50 being energized to operate its circuit breaking device, so that the partial circuit 90 including the solenoid coil of element 51 and the second section 50ᵃ of the shunt resistance will be traversed by the shunt field current, said element 51 being thereby energized in its turn to operate its circuit breaking device and insert the next partial circuit 91 including the solenoid winding at element 52 and the third section 51ᵃ of the shunt resistance in the shunt circuit and the element 52 being thereby energized to operate its circuit breaking device whereby the fourth section of resistance 52ᵃ is inserted in the shunt circuit. This operation above described can, however, only take place when the pilot switch lever has been moved to energize element 49, since when said element is not energized, its lowered connector 57 will bridge the contacts 56 and 58 and afford a short circuit by means of which the shunt field current is prevented from flowing through partial circuits 88 and 89 by reason of the greater resistance in said partial circuits, but after the elements 49 and 61 have been operated as above described, the partial circuit 88 is free to be traversed by the current of the shunt field.

By my improvements it will be seen that the several elements, excepting the controlling element 49 for the lower group, have their solenoid windings included in the shunt field circuit so that said windings when the elements are operated form, essentially, parts of the shunt field resistance, whereby the waste of energy which commonly takes place in controllers of this type wherein the magnetic rheostat elements are ordinarily operated by separate circuits from the feed conductors or in shunt with the armature is altogether avoided. In this way a material economy in the consumption of energy is effected and as the potential across the individual solenoids is very low I do not require to use such large windings in the solenoids or to form said windings from such fine gages of wire as is necessary in other constructions, and the small difference of potential between the solenoid windings and other parts of the circuit is not so liable to result in damage to the insulation and consequent break down of the controller.

By reason of the loose or compensating connection at 29 between the shaft 12 of the reversing switch and the main switch shaft 6 which permits the arms 11 and 11ᵃ of the reversing switch to maintain communication with their respective contacts even after the supply circuit has been interrupted by the return of the main switch shaft to its central or intermediate position as above described, the shunt field connections are maintained with the armature and current flows in the shunt circuit of the motor due to the dynamic action of the armature and the magnetic inertia of the field, and this flow continues until the motor comes to rest. In this way the auxiliary controlling switch comprising block 36 and contacts 35 and 38 is maintained in operation by the energization of the solenoid at element 37 in the construction shown in Fig. 1 or of the solenoid at 37ᵃ in the construction shown in Fig. 3, so that the solenoid 31 or 31ᵃ of switch actuating mechanism 30 cannot be again energized to reverse the armature connections at the reversing switch until the motor comes to rest, the block 36 remaining in raised position until the corresponding solenoid has been deënergized. Thus after once starting, it is impossible to reverse or again start until the motor shall have come to rest. This is a great advantage, especially where the motor is started under load and has a brake for stopping, as for instance on motors for electric elevators. It is so easy to operate the main switch from the pilot switch that a careless or irresponsible operator might damage the main switch by throwing it back and forth, using the heavy starting currents continuously and uselessly.

From the above description it will be obvious that the improved controller constructed according to my invention is of a comparatively simple and inexpensive nature and is especially well adapted for use by reason of the economy afforded by it in the consumption of energy and also by reason of the ease and convenience with which the device may be operated and of the precaution afforded by its use against damage due to carelessness or inattention on the part of the operator and it will also be obvious from the above description that the device is susceptible of some modification without material departure from the principles and spirit of the invention and for this reason I do not desire to be understood as limiting myself to the precise form and arrangement of the several parts herein shown in carrying out my invention in practice. For example, if desired, means may be provided at the pilot switch for controlling the insertion of the successive shunt resistance sections, so that the motor may be run at intermediate speeds as well as at the high and low speeds afforded by the construction herein shown. Or if desired, the main switch may be manually actuated instead of electrically actuated as herein shown. Where the main switch is manually actuated, the element 49 may be dispensed with and mechanical means may be provided for controlling the communication between the contacts 56 and 58 of said element for affording the necessary speed variations.

While I have herein shown the several magnetic elements or solenoids in circuit with the shunt-field of the motor, it is evident that this is not an essential feature of the invention, since said elements or solenoids may, with good results, be connected in other shunt circuits as, for example, the circuits of the large magnets or solenoids 30 and 31, or in circuit with a brake-magnet where the invention is employed in connection with a motor equipped with electric brakes. While it is advantageous and preferable, from the stand-point of economy, to connect said magnetic elements or solenoids in the shunt-field, it must be borne in mind that a prime essential is to secure the operation of the several magnetic elements in regular and uniform succession and properly timed by means of the retarding devices, so that the required resistance variations may be accurately and uniformly attained in the several circuits.

Having thus described my invention, what I claim and desire to secure by Letters Patent is—

1. A controller comprising a starting resistance having circuit connections, magnetic means for controlling the circuit connections of said starting resistance, and a magnetic device arranged to actuate the circuit controlling means of the starting resistance and having connections for including it in the shunt field circuit of a motor to be controlled.

2. A controller comprising resistance sections having circuit connections, contact devices controlling the circuit connections of the respective resistance sections, and a plurality of magnetic devices each of which has means for connecting it in circuit with a motor to be controlled and controls the circuit connections of another such device with a circuit of the motor to be controlled, said devices being arranged to successively actuate the contact devices for the several resistance sections.

3. A controller comprising resistance sections having circuit connections, normally open partial circuits connected in parallel with the respective resistance sections and means for closing the respective partial circuits and each including a magnetic device having circuit connections for including it in a circuit of the motor to be controlled, and including contact devices actuated from a similar magnetic device.

4. A controller comprising resistance sections having circuit connections, magnetic devices insertible in a circuit of the motor to be controlled and controlling the circuit connections of the respective resistance sections and a plurality of retarding means, one for each of said magnetic devices, for timing the operation thereof.

5. The combination of a motor, a plurality of resistance sections adapted to be included in circuit with the motor and a plurality of interdependent magnetic devices controlling the circuit connections of the respective resistance sections and having means for including them in circuit with the motor.

6. The combination of a motor, a plurality of resistance sections adapted to be included in circuit with the motor, circuit-closing devices controlling the circuit connections of the respective resistance sections, a plurality of magnetic devices having means for including it in circuit with the motor each arranged to operate one of the respective circuit-closing devices, and other circuit controlling devices each controlled by one of, and controlling another of said magnetic devices.

7. The combination of a motor, a plurality of resistance sections having circuit connections for including them in circuit with the motor, normally open partial circuits connected in parallel with the respective resistance sections, means for closing the respective normally open partial circuits, each such means including a magnetic device having means for including it in circuit with the motor, and circuit controlling devices each controlled by one of, and controlling another of the said magnetic devices.

8. The combination of a motor, a plurality of resistance sections having circuit connections with the motor, and interdependent magnetic elements each actuated from the flow of current in a circuit of said motor and arranged for successive operation to control the inclusion of the respective resistance sections in circuit with the motor.

9. The combination of a motor, a plurality of resistance sections adapted to be included in circuit with the motor, a plurality of interdependent magnetic devices controlling the circuit connections of the respective resistance sections and having means for including it in circuit with the motor, and a plurality of retarding means, one for each of such magnetic devices, for timing the operation thereof.

10. The combination of a compound-wound motor, a resistance adapted for insertion in the series-field circuit thereof, magnetic means for short-circuiting said resistance, other magnetic means for short-circuiting the series-windings of the motor and electrically actuated means comprising contact devices controlling the circuit connections of each such short-circuiting means and adapted to be included in a shunt-winding of the motor to be controlled.

11. The combination of a compound-wound motor, a sectional resistance in circuit with the series-windings thereof, a plurality of devices for short-circuiting the respective resistance sections, another device for short-circuiting the series-windings of the motor, and interdependent magnetic devices insertible in a motor circuit and arranged to actuate each of said short-circuiting devices.

12. The combination of a compound-wound motor, a plurality of resistance sections adapted for insertion in the series-field circuit thereof, magnetic elements insertible in a motor circuit and each actuated from the flow of current in a shunt-circuit and arranged for successive operation to control the circuit connections of the respective resistance sections and of the series-windings of the motor, and circuit-closing devices each controlled by one of the magnetic elements and controlling another of said magnetic elements.

13. A controller comprising a sectional resistance having circuit connections for connecting it in a motor-circuit and having normally closed short-circuiting connections, means capable of operation to successively break said short-circuiting connections and a magnetic device controlling said circuit-breaking means and adapted to be included in a shunt-circuit.

14. A controller comprising resistance sections having circuit connections for connecting them in circuit with a motor to be controlled, short-circuiting connections for the respective resistance sections, contact devices controlling the short-circuiting connections of the respective resistance sections, and interdependent magnetic devices controlling said contact devices and adapted to be included in circuit with the motor to be controlled.

15. The combination of a motor having a shunt field circuit, parallel conductors having means for connections in the shunt field circuit, one such conductor including a resistance and a magnetic element controlling the flow of current in the shunt field circuit along said parallel conductors and actuated from the flow of current in the shunt field circuit of the motor.

16. The combination of a motor having a shunt field circuit, a plurality of resistance sections adapted to be traversed by the current flowing in the shunt field circuit, means for controlling the flow of current in the shunt field through each of the resistance sections and a magnetic device arranged to operate each of said controlling means and included in the shunt field circuit.

17. The combination of a motor having a shunt field circuit, a plurality of resistance sections adapted to be traversed by the current flowing in said circuit and a plurality of magnetic devices each controlling the flow of current in the shunt field through one of said resistance sections and each included in the shunt field circuit.

18. The combination of a motor having a shunt field circuit, resistance sections having means to include them in circuit with the motor, a series of elements each controlling the flow of current in a motor circuit through one of the respective resistance sections, the operation of the first element of the series being controlled by the flow of current in the shunt field circuit of the motor and the operation of each succeeding element in the series being controlled by the operation of the preceding element.

19. The combination of a motor having a shunt field circuit, resistance sections having means to include them in circuit with the motor, a series of elements each controlling the flow of current in a motor circuit through one of the respective resistance sections, the operation of the first element in the series being controlled by the flow of current in the shunt field circuit of the motor and the operation of each succeeding element in the series being controlled by the operation of the preceding element and means for retarding the operation of each of said elements.

20. The combination of a motor having a shunt field circuit, resistance sections having means to include them in circuit with the motor, a series of elements having circuit connections to actuate them from the current flow in the shunt field circuit of the motor and each controlling the flow of current in a motor circuit through one of said resistance sections, means for controlling the flow of current in the shunt field through the circuit connections of the first element of the series and means, controlled by the operation of a preceding element in the series for controlling the flow of current from the shunt field through the circuit connections of each succeeding element in the series.

21. The combination of a motor having a shunt field circuit, two resistances having means for including them in circuit with the motor, elements having circuit connections for actuating them from the current flow in the shunt field circuit of the motor and each controlling the flow of current in a motor circuit through one of said resistances, means actuated from the operation of one element for controlling the current flow in the shunt field circuit through the circuit connections of the other element and other means for controlling the operation of said elements independently of each other.

22. The combination of a motor having a shunt field circuit, two sectional resistances having means for including them in different motor circuits, two groups of elements, the elements of each group controlling the current flow in different motor circuits through the respective sections of one of said resistances, means for controlling the operation of the elements of one group from the operation of the elements of the other group and other means for controlling the operation of the elements of each group independently of the other group.

23. The combination of a motor having a shunt field circuit, two sectional resistances having means for including them in different motor circuits, two groups of elements, the elements of the respective groups controlling the current flow in different motor circuits through the several sections of the respective resistances, means for controlling the operation of the first element in one group from the current flow in the shunt field circuit of the motor, means for controlling the operation of each succeeding element in that group from the operation of the preceding element in that group and means for controlling the operation of the elements of the other group independently of said first-named group.

24. The combination of supply terminals, a motor, a switch device controlling connection of the motor circuits with the supply terminals, solenoids for actuating the switch device to make connection between the terminals of the motor circuits and said supply terminals and magnetic means included in a shunt-circuit and controlling the operation of said solenoids.

25. The combination of supply terminals, a motor, a switch device controlling connection of the motor circuits with the supply terminals, electrically operated mechanism having circuit connections and arranged for actuating the switch device to make and break connection between the terminals of the motor circuits and said supply terminals, a resistance having means for including it in the circuit of said electrically operated mechanism and magnetic means actuated from the flow of current in one of the motor circuits and controlling the insertion of said resistance in circuit with said electrically operated mechanism.

26. The combination of supply terminals, a motor, switch mechanism controlling the connection of the motor circuits with said supply terminals, electrically-operated switch-actuating means comprising a partial circuit adapted for connection across the supply terminals, and means controlled from the flow of current in a motor circuit for varying the current flow in said partial circuit of the switch-actuating means.

27. The combination of supply terminals, a motor, switch mechanism controlling the connection of the motor circuits with said supply terminals, electrically - operated switch-actuating means comprising a partial circuit adapted for connection across the supply terminals, a resistance insertible in said partial circuit, and means controlled from the flow of current in a motor circuit for controlling the insertion of said resistance in said partial circuit of the switch-actuating means.

28. The combination of supply terminals, a motor, switch mechanism controlling the connection of the motor circuits with said supply terminals, electrically - operated switch-actuating means comprising a partial circuit adapted for connection across the supply terminals, and means controlled from the actuation of the switch mechanism and controlling the supply of current to said partial circuit of the switch-actuating means.

29. The combination of supply terminals, a motor, switch mechanism controlling the connection of the motor circuits with said supply terminals, electrically-operated switch actuating means comprising a partial circuit adapted for connection across the supply terminals, and a resistance insertible in said partial circuit for varying the current flow therein.

30. A controller having a series of magnetic devices having circuit connections for including them in circuit with a motor to be controlled, and a series of contact devices each controlled from the operation of one of said magnetic devices and controlling the circuit connections of another such magnetic device with a motor to be controlled.

31. A controller comprising a series of magnetic circuit controlling devices having means for including them in circuit with a motor to be controlled, each such device having retarding means and being provided with contact devices whereby near the end of its stroke it energizes the succeeding magnetic device in the said series.

32. A controller comprising magnetic circuit-controlling elements arranged in two series, the elements of each series being adapted for successive operation, means adapted for operation in unison with one of the elements in one series for controlling the operation of the elements of the other series, and mechanism for independently-controlling the operation of the elements of the respective series.

33. A controller comprising a series of magnetic circuit-controlling devices, and means for including them in circuit with a motor or translator to be controlled, each such device having retarding means and being provided with contact devices whereby near the end of its stroke it energizes the succeeding magnetic device in the said series.

Signed at Cincinnati, Ohio, this 13th day of January, 1906.

OSCAR F. SHEPARD, Jr.

Witnesses:
 JOHN ELIAS JONES,
 L. W. JONES.